United States Patent [19]

Fuchigami

[11] Patent Number: 5,331,497
[45] Date of Patent: Jul. 19, 1994

[54] THIN FILM MAGNETIC HEAD

[75] Inventor: Shoji Fuchigami, Kumamoto, Japan

[73] Assignee: Matsushita Electric Industrial Co., Ltd., Osaka, Japan

[21] Appl. No.: 85,140

[22] Filed: Jul. 2, 1993

Related U.S. Application Data

[63] Continuation of Ser. No. 737,146, Jul. 29, 1991, abandoned.

[30] Foreign Application Priority Data

Jul. 30, 1990 [JP] Japan .................. 2-202172

[51] Int. Cl.⁵ .................. G11B 5/31; G11B 5/187
[52] U.S. Cl. .................. 360/126; 360/122
[58] Field of Search .................. 360/126, 122, 103

[56] References Cited

U.S. PATENT DOCUMENTS

| | | | |
|---|---|---|---|
| 4,797,765 | 1/1989 | Ezaki et al. | 360/126 |
| 5,130,877 | 7/1992 | Hsie et al. | 360/126 |

FOREIGN PATENT DOCUMENTS 61-237216  10/1986  Japan .

*Primary Examiner*—Robert S. Tupper
*Attorney, Agent, or Firm*—Pollock, Vande Sande & Priddy

[57] ABSTRACT

A thin film magnetic head of the type including an upper magnetic core adjoining a gap layer having a flat front end face along which a magnetic recording medium is linearly slidable has a front end face of the upper magnetic core retreating from the magnetic recording medium at an end remote from the gap layer. The thin film magnetic head thus constructed provides a reproducing output signal which is free from a reverse output and hence has a waveform of an excellent symmetry, and also has a frequency characteristic curve free from fluctuations. In addition, the thin film magnetic head of this invention is able to obviate a magnetic saturation problem associated with the conventional thin film magnetic head, provide a stable output, and perform a reproducing operation efficiently.

21 Claims, 6 Drawing Sheets

THIN FILM MAGNETIC HEAD

This application is a continuation, of Ser. No. 07/737,146 filed on Jul. 29, 1991, now abandoned.

BACKGROUND OF THE INVENTION

1. Field of the Invention:

The present invention relates to a thin film magnetic head for recording and/or reproducing data on a magnetic recording medium such as a magnetic disk.

2. Description of the Prior Art:

A typical example of conventional thin film magnetic heads is shown here in FIGS. 4(a) and 4(b) of the accompanying drawings. The conventional thin film magnetic head includes a magnetic circuit which is composed of a magnetic substrate made from a magnetic material such as an Mn-Zn ferrite, a gap layer 15, a coil 12, an upper magnetic core 13 and a protective film 14 formed on the magnetic substrate 11 in superposed relation in the order named by using a photolithographic processing of insulating films and conductive films formed by sputtering deposition or vacuum evaporation on the magnetic substrate 11. The magnetic substrate 11 constitutes a lower magnetic core relative to the upper magnetic core 13. As best shown in FIG. 5, the front face of the conventional thin film magnetic head which is adapted to face the recording surface of a magnetic recording medium, not shown, is polished or lapped into a flat surface and the upper magnetic core 13 has a thickness 1 at the front end face.

Since the front end face of the upper magnetic core 13 is flat and has a limited extent in the direction of thickness such as indicated by 1 in FIG. 5, the magnetic flux is able to flow from the front end face of the upper magnetic core 13 over the gap layer 15 into the magnetic substrate 11, thereby reproducing an output other than a desired output.

More specifically, the waveform of an isolated pulse which is reproduced by the conventional thin film magnetic head shown in FIGS. 4(a), 4(b) and 5 includes a distortion appearing in the form of a reverse output C, as shown in FIG. 6. The reverse output C is produced due to the front end face of the upper magnetic core 13 which is flat and has the limited thickness 1 shown in FIG. 5. The position at which the reverse output C is produced is determined by the width of the front end face of the upper magnetic core 13. In addition, the conventional thin film magnetic head has a frequency characteristic curve such as indicated by dash lines in FIG. 7. The frequency characteristic curve includes fluctuations D and E which occur at frequency levels determined by the thickness 1 (FIG. 5) of the upper magnetic core 13 (equal to the width of the front end face of the upper magnetic core 13). In order to reduce the negative influence of the fluctuations, the thickness 1 of the upper magnetic core 13 measured at the front end face is made considerably smaller than the overall thickness of the upper magnetic core 13, as shown in FIG. 5. With this construction, the magnetic flux is likely to saturate due to a sudden increase in the magnetic flux density of the upper magnetic core 13 at a position indicated by B in FIG. 5. Further, even though the thickness 1 of the upper magnetic core 13 at its front end face is considerably reduced, the fluctuations of the reproduced output still occur, affecting the magnetic recording/reproducing characteristics of the thin film magnetic head.

SUMMARY OF THE INVENTION

With the foregoing drawbacks of the prior art in view, it is an object of the present invention to provide a thin film magnetic head which is capable of recording and/or reproducing data on a magnetic recording medium without causing a fluctuation in frequency characteristics of a reproduced output and without the occurrence of a saturation of the magnetic flux through a magnetic core.

A thin film magnetic head according to this invention for recording and/or reproducing data on a magnetic recording medium comprises a magnetic substrate, an upper magnetic core disposed on the magnetic substrate with a gap layer disposed therebetween, and a coil disposed between the upper magnetic core and the magnetic substrate. The upper magnetic core has a front end face confronting the magnetic recording medium and extending non-parallel to a flat front end face of the gap layer.

The magnetic substrate may be substituted by a non-magnetic substrate in which instance a lower magnetic core is disposed between the non-magnetic substrate and the gap layer.

Preferably, the front end face of the upper magnetic core progressively retreats relative to the magnetic recording medium in a direction from an end adjacent to the gap layer toward an opposite end remote from the gap layer. The front end face of the upper magnetic core may be slanted backward relative to the front end face of the gap layer, or alternatively it is curved arcuately backward relative to the front end face of the gap layer. The amount of retreat of the front end face of the upper magnetic core measured at the opposite end is preferably greater than 0.04 μm.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE PREFERRED EMBODIMENTS

The present invention will be described in greater detail with reference to certain preferred embodiments shown in the accompanying drawings.

Figure 1:
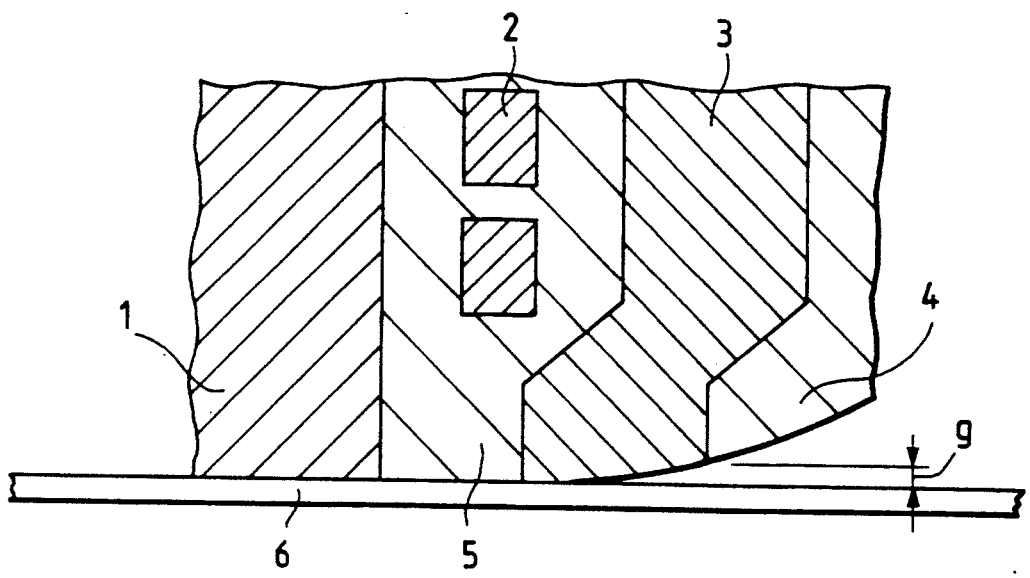
FIG. 1 is an enlarged cross-sectional view of a portion of a thin film magnetic head according to an embodiment of this invention.

As shown in FIG. 1, a thin film magnetic head embodying the present invention includes a magnetic substrate 1 constituting a lower magnetic core and made from a magnetic material such as an Mn-Zn ferrite, an Ni-Zn ferrite, etc. On the magnetic substrate 1, there are disposed a gap layer 5, a coil 2, an upper magnetic core 3 and a protective layer 4 substantially in a superposed relation to one another. The gap layer 5 is formed by depositing $SiO_2$ or $Al_2O_3$ on the magnetic substrate 1 using the sputtering deposition or the vacuum evaporation. The coil 2 is a film of a conductive metal such as Cu, Au, Al, etc. which is formed by plating, sputtering deposition or vacuum evaporation followed by proper shaping of the conductive film into a desired configuration. The upper magnetic core 3 is a thin film of a magnetic material, such as Permalloy (tradename), Sendust (tradename) or a magnetic amorphous material, which is formed by the sputtering deposition, plating or vacuum evaporation followed by proper shaping of the magnetic thin film into a desired configuration. The protective layer 4 is formed by depositing $SiO_2$ or $Al_2O_3$ on the upper magnetic core 3 using sputtering deposition or vacuum evaporation.

The thin film magnetic head of the foregoing construction has a front end face confronting a magnetic recording medium 6. The magnetic recording medium 6 is linearly slidable along front end faces of the magnetic substrate 1 and the gap layer 5. A portion of the front end face including the upper magnetic core 3 and the protective layer 4 is rounded or curved arcuately such that an end of the upper magnetic core 4 which is remote from the gap layer 5 is offset or spaced from a surface of the magnetic recording medium 6 by a distance g (hereinafter referred to as "offset distance"). More specifically, the front end face of the upper magnetic core 3 and the front end face of the protective layer 4 are arcuate and extend continuously in such a manner that the arcuate front end faces are progressively spaced away from a surface of the magnetic recording medium 6 in a direction from one end adjacent to the gap layer 5 toward the opposite end remote from the gap layer 5.

Figure 2:
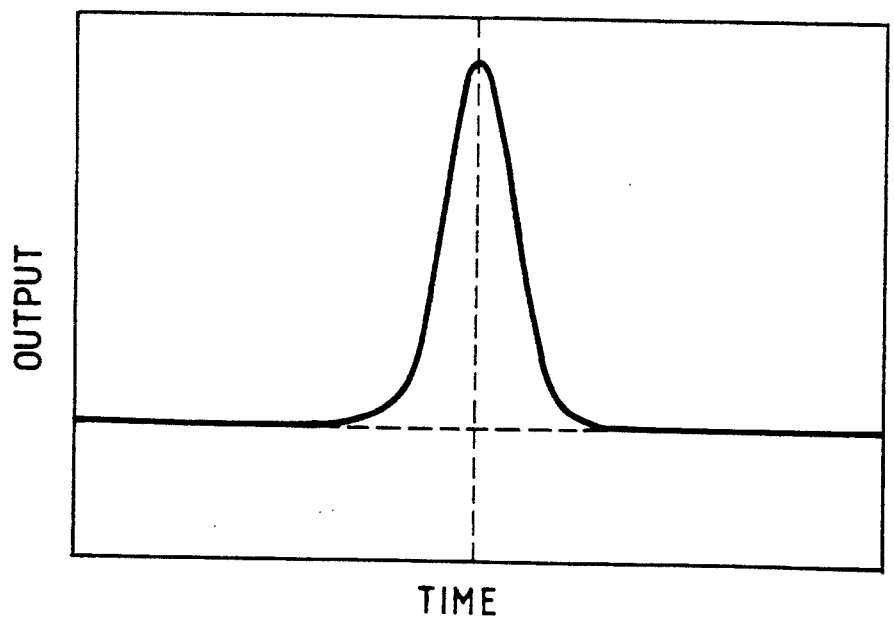
FIG. 2 is a graph showing the waveform of a reproducing output signal of the thin film magnetic head.
Figure 3:
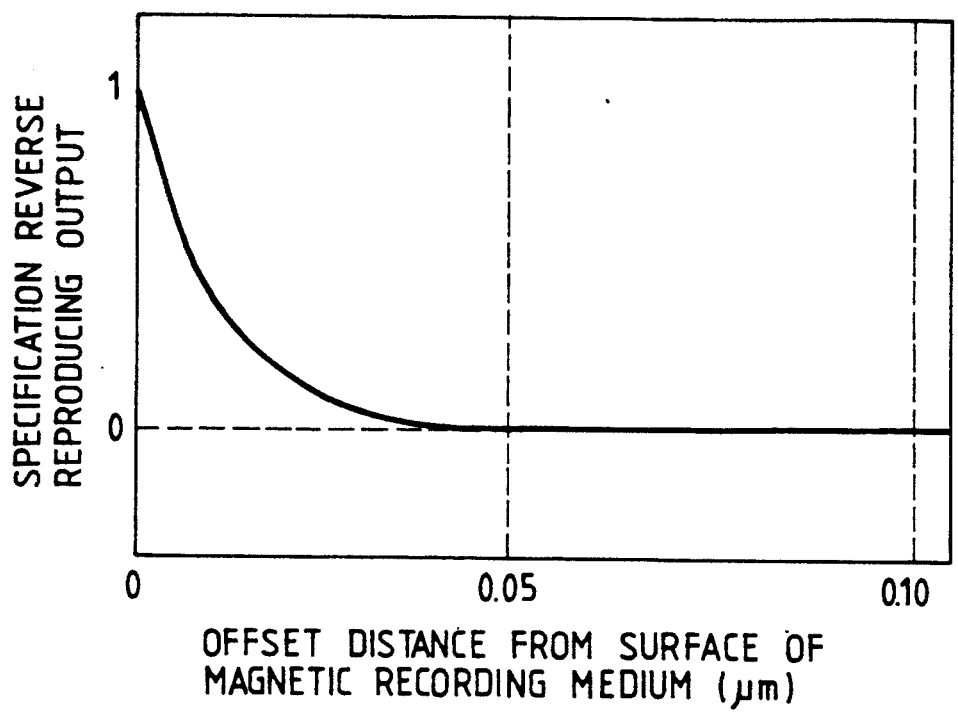
FIG. 3 is a graph showing the relationship between the offset distance and the specification reverse reproducing output.
Figure 4A:
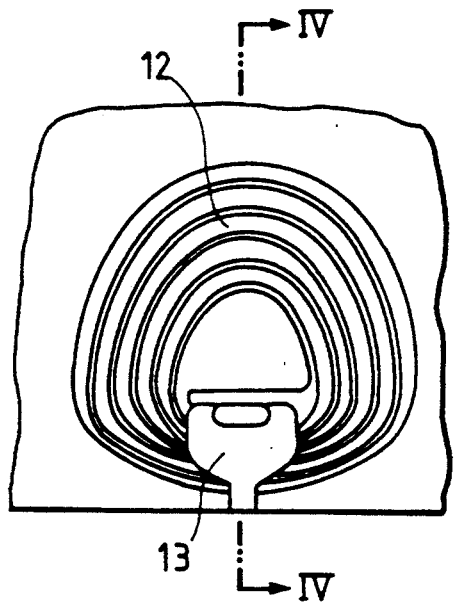
FIG. 4(a) is a plan view of a conventional thin film magnetic head.
Figure 4B:
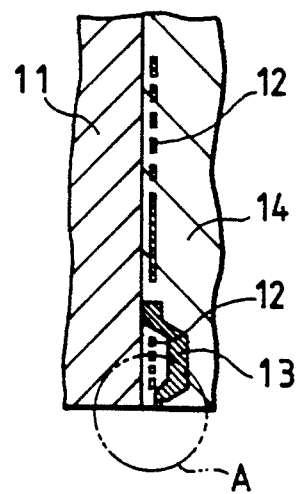
FIG. 4(b) is a cross-sectional view taken along line IV—IV of FIG. 4(a)
Figure 5:
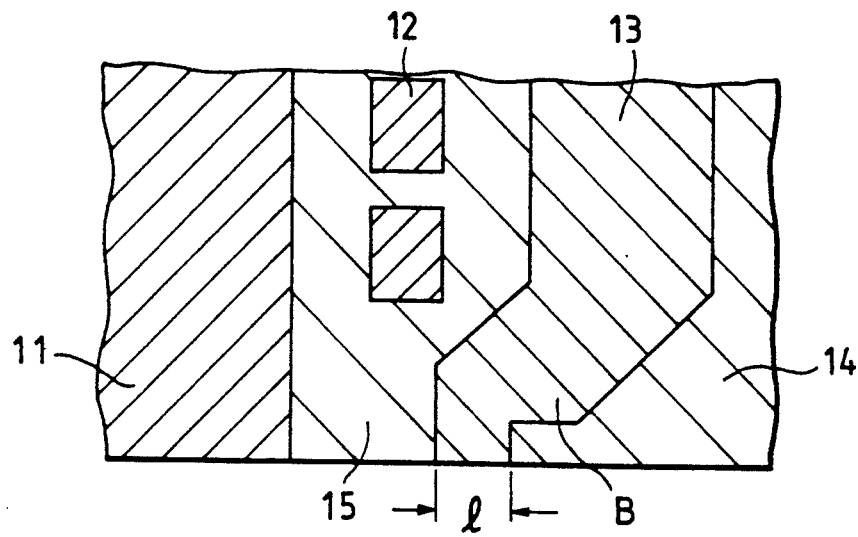
FIG. 5 is an enlarged cross-sectional view of a portion indicated by A in FIG. 4(b)
Figure 6:
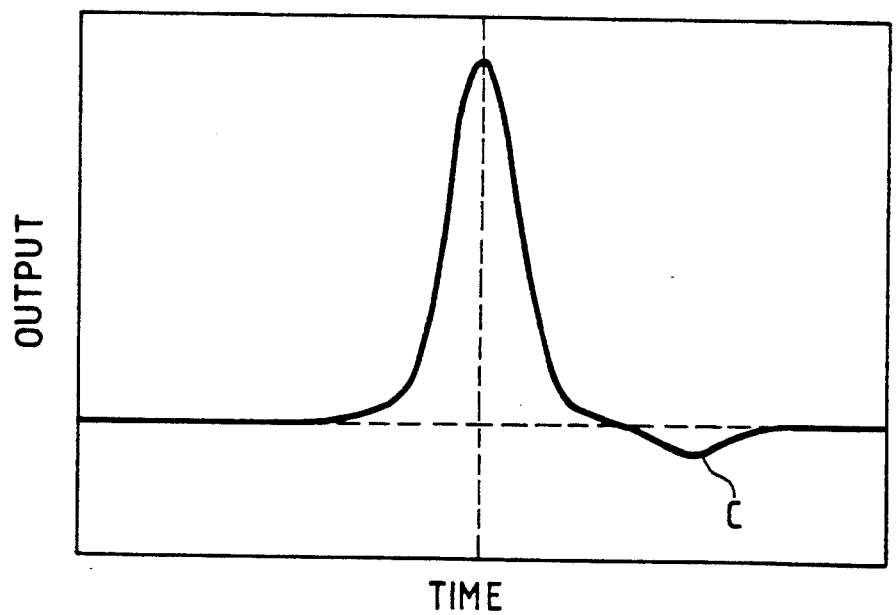
FIG. 6 is a graph showing the waveform of a reproducing output signal.
Figure 7:
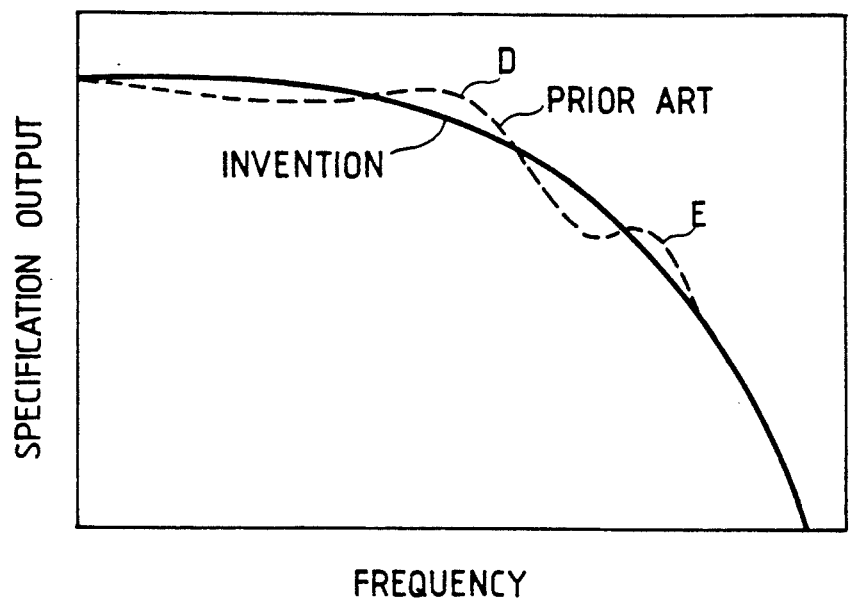
FIG. 7 is a graph showing the specification output vs. frequency characteristic curves of the inventive thin film magnetic head and the conventional thin film magnetic head.

The thin film magnetic head of foregoing construction, as against the conventional thin film magnetic head, produces a reproducing output signal of a waveform which is free from a reverse reproducing output, as shown in FIG. 2. In addition, the thin film magnetic head of this invention has a frequency characteristic curve which is smooth and free from fluctuation as indicated by the solid line in FIG. 7. With this smooth and fluctuation-free frequency characteristic curve, a filter can easily be incorporated in a reproducing circuit. FIG. 3 shows changes of the specification reproducing output taken with respect to the offset distance g (FIG. 1) between the thin film magnetic head and the magnetic recording medium. As is apparent from FIG. 3, the generation of a reverse reproducing output can be avoided when the offset distance g is greater than about 0.04 $\mu$m.

Figure 8:
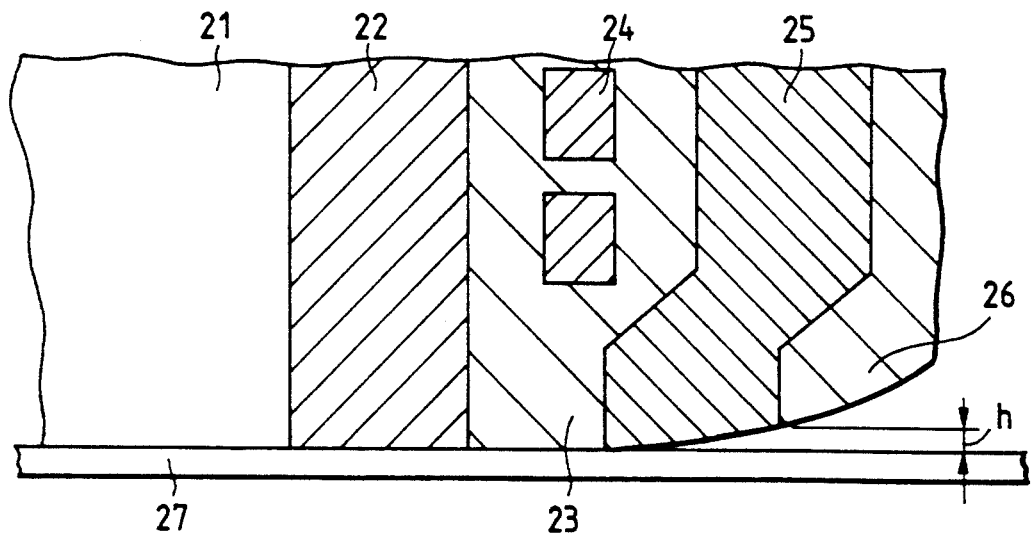
FIG. 8 is an enlarged cross-sectional view of a portion of a thin film magnetic head according to another embodiment.

FIG. 8 shows, in cross-section, a thin film magnetic head according to another embodiment of this invention. The thin film magnetic head includes a non-magnetic substrate 21 on which a lower magnetic core 22, a gap layer 23, a coil 24, an upper magnetic core 25 and a protective layer 26 are disposed in a superposed relation to one another. The non-magnetic substrate 21 is made from a non-magnetic material such as $Al_2O_3TiC$. The lower magnetic core 22 is a thin film of a magnetic material, such as Permalloy, Sendust or a magnetic amorphous material, which is formed by sputtering deposition, vacuum evaporation or plating followed by proper shaping of the magnetic thin film into a desired configuration. The gap layer 23 is formed by depositing $SiO_2$ or $Al_2O_3$ on the lower magnetic core 22 by using sputtering deposition or vacuum evaporation. The coil 24 is a film of a conductive metal such as Cu, Au, Al, etc. which is formed by plating, sputtering deposition or vacuum evaporation followed by proper shaping of the conductive film into a desired configuration. The upper magnetic core 25 is a thin film of a magnetic material, such as Permalloy, Sendust or a magnetic amorphous material, which is formed by sputtering deposition, vacuum evaporation or plating followed by proper shaping of the magnetic thin film into a desired configuration. The protective layer 26 is formed by depositing $SiO_2$ or $Al_2O_3$ on the upper magnetic core 25 by using sputtering deposition or vacuum evaporation.

The thin film magnetic head of the foregoing construction has a front end face confronting a magnetic recording medium 27 which is linearly slidable along flat end faces of the non-magnetic substrate 21, the lower magnetic core 22 and the gap layer 23. A portion of the front end face of the thin film magnetic head which includes the upper magnetic core 25 and the protective layer 26 is offset or retreats such that an end of the upper magnetic core 24 which is remote from the gap layer 23 is spaced from a surface of the magnetic recording medium 27 by a distance h. More specifically, the front end face of the upper magnetic core 25 and the front end face of the protective layer 26 are arcuate and extend continuously in such a manner that the arcuate front end faces are progressively spaced from a surface of the magnetic recording medium 27. The thin film magnetic head shown in FIG. 8 operates in the same manner as the thin film magnetic head of the embodiment shown in FIG. 1, that is, it is capable of operating properly without the occurrence of a reverse reproducing output and has a smooth frequency characteristic curve which is free from fluctuations and hence enables an easy adaptation of a filter in a reproducing circuit.

In the embodiments shown in FIGS. 1 and 8, the front end face of the upper magnetic core 3 or 25 is curved arcuately and progressively retreats from the magnetic recording medium in a direction from an end adjacent to the gap layer 5 or 23 toward the opposite end remote from the gap layer 5 or 23. The same advantageous effects as attained by the upper magnetic core 3 or 25 can be obtained when the upper magnetic core has a flat end face extending obliquely backward from the flat end face of the gap layer 5 or 23.

Figure 9:
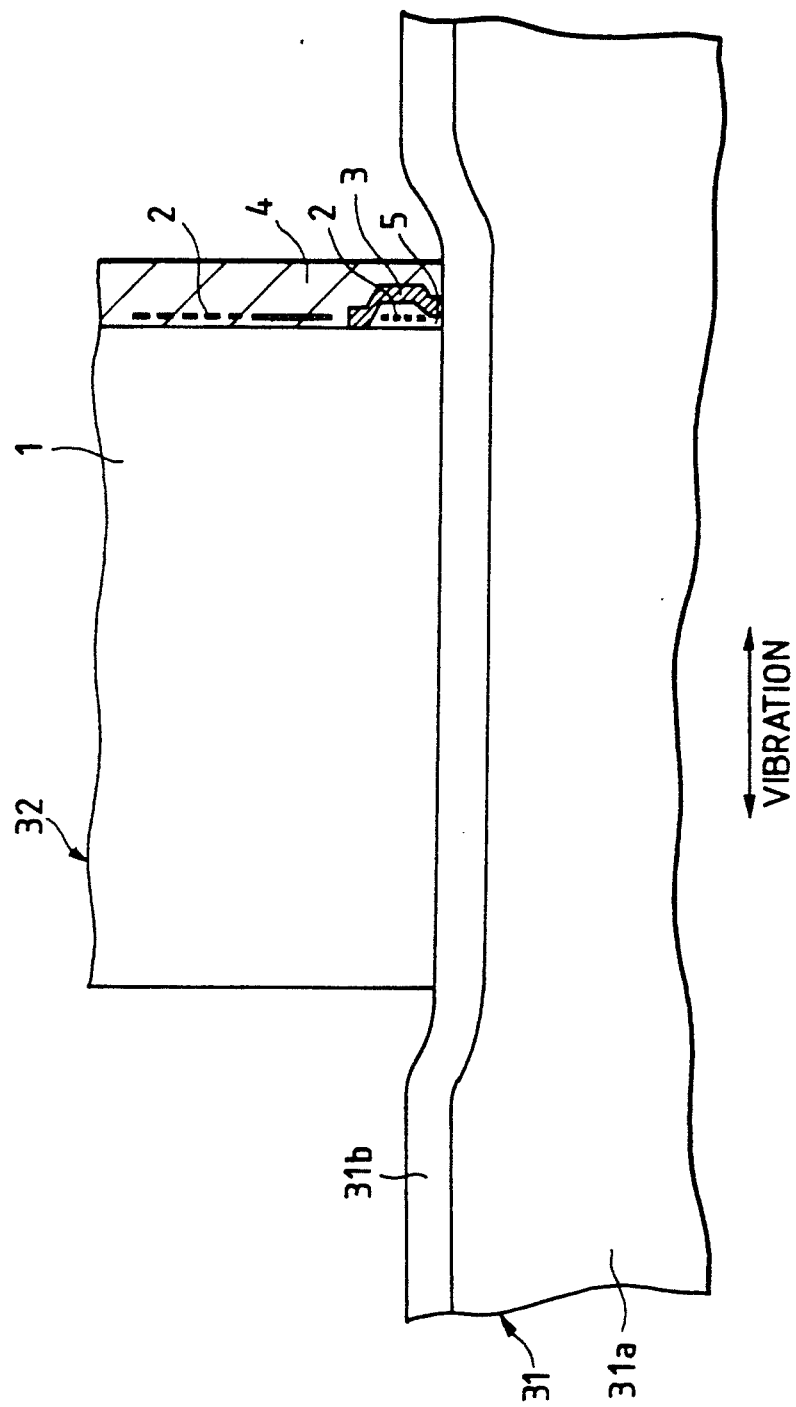
FIG. 9 is a diagrammatical view illustrative of a manner in which a thin film magnetic head of this invention is manufactured.

The partly offset or retreating front end face of the thin film magnetic head is produced in a manner described below with reference to FIG. 9. A thin film magnetic head 32 is forced against a base member 31 with a flat front end face of the magnetic head 32 held in pressure contact with a lapping film 31b of the base member 31 which is adhered to a base 31a made of soft rubber. Then, a vibrating machine, not shown, is activated to oscillate the base member 31 in the direction indicated by the arrowheads, thereby causing the thin film magnetic head 32 to oscillate finely on the base member 31 so that a front end face of the upper core member 3 is lapped so as to retreat progressively as the distance from the gap layer 5 increases. In this instance, the amount of lapping can be adjusted by properly changing the frequency and amplitude of vibration exerted on the base member 31 and the lapping time. In practice, the frequency of vibration used to lap or polish the front end face of the thin film magnetic head 32 is 60 Hz and the amplitude of vibration is 0.1 μm. The thin film magnetic head shown in FIG. 8 can be finished in the same manner as described above.

Figure 10:
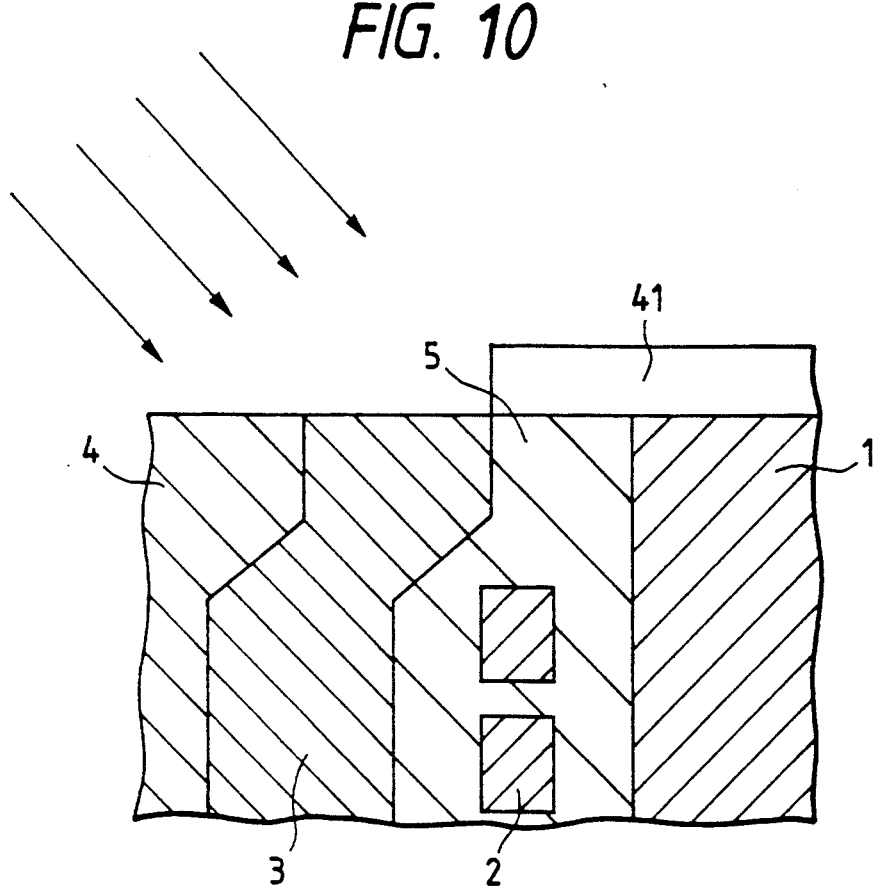
FIG. 10 is a diagrammatical view showing another process of making the thin film magnetic head of this invention.

FIG. 10 illustrates another process for making a partly retreating front end face of the thin film magnetic head (identical to the magnetic head shown in FIG. 1). After a photoresist film 41 is formed on a flat front end face of the thin film magnetic head to cover the magnetic substrate 1 and the gap layer 5, the front end face is etched in the direction of the arrows for a predetermined period of time by the ion-milling process. Then, the photoresist film 41 is removed. Thus, the thin film magnetic head shown in FIG. 1 is produced. Obviously, the partly retreating front end face of the thin film magnetic head shown in FIG. 8 can be formed by the same process.

Figure 11:
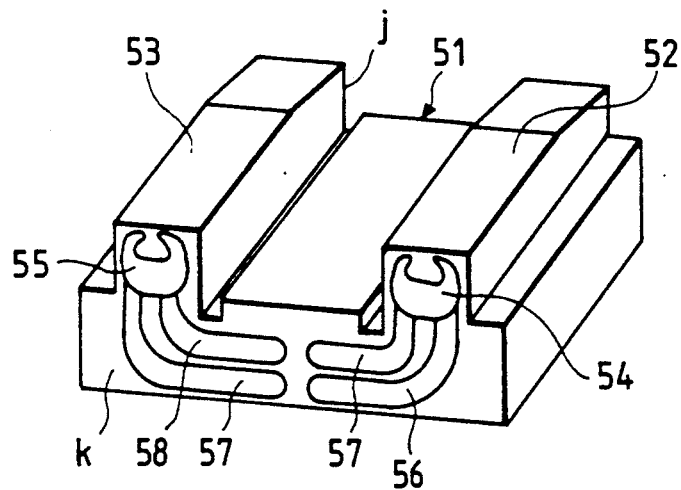
FIG. 11 is a schematic perspective view of a floating type magnetic head incorporating a thin film magnetic head of this invention.

FIG. 11 shows a slider 51 made from a non-magnetic material such as ceramics. The slider 51 includes a pair of parallel spaced floating rails 52, 53 and has an inlet end j from which air flows into the slider 51, and an outlet end k from which air flows out from the slider 51. A pair of thin film magnetic heads 54, 55 which are identical in construction to the thin film magnetic head shown in FIG. 8 is disposed on one end face of the respective rails 52, 53 at the outlet end k of the slider 51. A pair of terminals 56, 57 is connected to the coil of the thin film magnetic head 54, while a pair of terminals 57, 58 is connected to the coil of the thin film magnetic head 55. The thin film magnetic heads used in the form of floating type magnetic heads perform data recording and/or reproducing operations properly while providing the various advantageous effects stated above. The thin film magnetic head shown in FIG. 1 may be employed in the form of a floating type magnetic head in which instance the slider is made of a magnetic material such as a ferrite.

As described above, a thin film magnetic head of this invention, as opposed to the conventional thin film magnetic head, is capable of providing a reproducing output signal which is free from a reverse output and hence is excellent in symmetry. In addition, the frequency characteristic curve of the thin film magnetic head is free of fluctuations. Furthermore, the thin film magnetic head of this invention is able to obviate a magnetic saturation problem associated with the conventional magnetic head, provide a stable output, and perform the reproducing operation efficiently.

Obviously, various minor changes and modifications of the present invention are possible in the light of the above teaching. It is therefore to be understood that within the scope of the appended claims the invention may be practiced otherwise than as specifically described.

What is claimed is:

1. A thin film magnetic head for recording and/or reproducing data on a magnetic recording medium, comprising:
   (a) a magnetic substrate;
   (b) an upper magnetic core disposed on said magnetic substrate with a gap layer disposed therebetween;
   (c) a coil disposed between said upper magnetic core and said magnetic substrate and electrically insulated from said upper magnetic core and said magnetic substrate;
   (d) a protective layer disposed on said upper magnetic core; and
   (e) said gap layer having a front end face confronting the magnetic recording medium, said upper magnetic core having a front end face confronting the magnetic recording medium, said protective layer having a front end face confronting the magnetic recording medium, said front end face of said upper magnetic core extending from its one end adjacent to said gap layer to its opposite end adjacent to said protective layer so as to provide distance variation therealong between said front end face of said upper magnetic core and said magnetic recording medium such that said front end face of said upper magnetic core progressively retreats relative to the magnetic recording medium in a direction from said one end toward said opposite end, said distance variation continuously provided from said one end to said opposite end.

2. A thin film magnetic head for recording and/or reproducing data on a magnetic recording medium, comprising:
   (a) a magnetic substrate;
   (b) an upper magnetic core disposed on said magnetic substrate with a gap layer disposed therebetween;
   (c) a coil disposed between said upper magnetic core and said magnetic substrate and electrically insulated from said upper magnetic core and said magnetic substrate; and
   (d) said gap layer having a flat front end face confronting the magnetic recording medium, said upper magnetic core having a front end face confronting the magnetic recording medium, said front end face of said upper magnetic core having one end adjacent to said gap layer and an opposite end remote from said gap layer, said front end face of said upper magnetic core retreating from the magnetic recording medium such that said opposite end of said front end face is spaced more distantly from the magnetic recording medium than said one end of said front face,
   wherein said front end face of said upper magnetic core progressively retreats relative to the magnetic recording medium from said one end adjacent to said gap layer toward said opposite end remote from said gap layer.

3. A thin film magnetic head according to claim 2 wherein said front end face of said upper magnetic core extends continuously and arcuately from an end of said flat front end face of said gap layer.

4. A thin film magnetic head according to claim 2 wherein the amount of retreat of said front end face of said upper magnetic core measured as a distance between said one end and said opposite end is greater than 0.04 μm.

5. A thin film magnetic head for recording and/or reproducing data on a magnetic recording medium, comprising:
   (a) a non-magnetic substrate;
   (b) a lower magnetic core disposed on said nonmagnetic substrate;
   (c) an upper magnetic core disposed on said lower magnetic core with a gap layer disposed therebetween;
   (d) a coil disposed between said upper and lower magnetic cores and electrically insulated from said upper and lower magnetic cores;
   (e) a protective layer disposed on said upper magnetic core; and
   (f) said gap layer having a flat front end face confronting the magnetic recording medium, said upper magnetic core having a front end face confronting the magnetic recording medium, said protective layer having a front end face confronting the magnetic recording medium, said front end face of said upper magnetic core extending from its one end adjacent to said gap layer to its opposite end adjacent to said protective so as to provide distance variation therealong between said front end face of said upper magnetic core and said magnetic recording medium such that said front end face of said upper magnetic core progressively retreats relative to the magnetic recording medium in a direction from said one end toward said opposite end, said distance variation continuously provided from said one end to said opposite end.

6. A thin film magnetic head for recording and/or reproducing data on a magnetic recording medium, comprising:
   (a) a non-magnetic substrate;
   (b) a lower magnetic core disposed on said nonmagnetic substrate;
   (c) an upper magnetic core disposed on said lower magnetic core with a gap layer disposed therebetween;
   (d) a coil disposed between said upper and lower magnetic cores and electrically insulated from said upper and lower magnetic cores; and
   (e) said gap layer having a flat front end face confronting the magnetic recording medium, said upper magnetic core having a front end face confronting the magnetic recording medium, said front end face of said upper magnetic core having one end adjacent to said gap layer and an opposite end remote from said gap layer, said front end face of said upper magnetic core retreating from the magnetic recording medium such that said opposite end of said front end face is spaced more distantly from the magnetic recording medium than said one end of said front face,
   wherein said front end face of said upper magnetic core progressively retreats relative to the magnetic recording medium from said one end adjacent to said gap layer toward said opposite end remote from said gap layer.

7. A thin film magnetic head according to claim 6 wherein the progressive retreat of said front end face of said upper magnetic core is greater than 0.04 μm.

8. A thin film magnetic head for recording and/or reproducing data on a magnetic recording medium, comprising:
   (a) a non-magnetic substrate;
   (b) a lower magnetic core disposed on said non-magnetic substrate;
   (c) an upper magnetic core disposed on said lower magnetic core with a gap layer disposed therebetween;
   (d) a coil disposed between said upper and lower magnetic cores and electrically insulated from said upper and lower magnetic cores; and
   (e) said gap layer having a flat front end face confronting the magnetic recording medium, said upper magnetic core having a front end face confronting the magnetic recording medium, said front end face of said upper magnetic core having one end adjacent to said gap layer and an opposite end remote from said gap layer, said front end face of said upper magnetic core retreating from the magnetic recording medium such that said opposite end of said front end face is spaced more distantly from the magnetic recording medium than said one end of said front face,
   wherein said front end face of said upper magnetic core extends continuously and arcuately from an end of said flat front end face of said gap layer.

9. A thin film magnetic head for recording and/or reproducing data on a magnetic recording medium, comprising:
   (a) a magnetic substrate;
   (b) an upper magnetic core disposed on said magnetic substrate with a gap layer disposed therebetween;
   (c) a coil disposed between said upper magnetic core and said magnetic substrate and electrically insulated from said upper magnetic core and said magnetic substrate;
   (d) a protective layer disposed on said upper magnetic core; and
   (e) said gap layer having a front end face confronting the magnetic recording medium, said upper magnetic core having a front end face confronting the magnetic recording medium, said protective layer having a front end face confronting the magnetic recording medium, said front end face of said upper magnetic core having one end adjacent to said gap layer and an opposite end adjacent to said protective layer, said front end face of said upper magnetic core gradually displaced relative to the magnetic recording medium such that said opposite end of said front end face is spaced more distantly from the magnetic recording medium than said one end of said front end face, said gradual displacement of said front end face of said upper magnetic core continuously provided from said one end to said opposite end.

10. A thin film magnetic head according to claim 9, wherein said front end face of said upper magnetic core extends arcuately from said one end to said opposite end.

11. A thin film magnetic head according to claim 10, wherein said front end face of said protective layer extends arcuately so as to be continuous with said front end face of said upper magnetic core extending arcuately.

12. A thin film magnetic head according to claim 9, wherein said gradual displacement of said front end face of said upper magnetic core is greater than 0.04 μm.

13. A thin film magnetic head for recording and/or reproducing data on a magnetic recording medium, comprising:

(a) a non-magnetic substrate;

(b) a lower magnetic core disposed on said nonmagnetic substrate;

(c) an upper magnetic core disposed on said lower magnetic core with a gap layer disposed therebetween;

(d) a coil disposed between said upper and lower magnetic cores and electrically insulated from said upper and lower magnetic cores;

(e) a protective layer disposed on said upper magnetic core; and (f) said gap layer having a front end face confronting the magnetic recording medium, said upper magnetic core having a front end face confronting the magnetic recording medium, said protective layer having a front end face confronting the magnetic recording medium, said front end face of said upper magnetic core having one end adjacent to said gap layer and an opposite end adjacent to said protective layer, said front end face of said upper magnetic core gradually displaced relative to the magnetic recording medium such that said opposite end of said front end face is spaced more distantly from the magnetic recording medium than said one end of said front end face, said gradual displacement of said front end face of said upper magnetic core continuously provided from said one end to said opposite end.

14. A thin film magnetic head according to claim 13, wherein said front end face of said upper magnetic core extends arcuately from said one end to said opposite end.

15. A thin film magnetic head according to claim 14, wherein said front end face of said protective layer extends arcuately so as to be continuous with said front end face of said upper magnetic core extending arcuately.

16. A thin film magnetic head according to claim 13, wherein said gradual displacement of said front end face of said upper magnetic core is greater than 0.04 μm.

17. A thin film magnetic head for recording and/or reproducing data on a magnetic recording medium, comprising:

(a) a magnetic substrate;

(b) an upper magnetic core disposed on said magnetic substrate with a gap layer disposed therebetween;

(c) a coil disposed between said upper magnetic core and said magnetic substrate and electrically insulated from said upper magnetic core and said magnetic substrate; and (d) said gap layer having a front end face confronting the magnetic recording medium, said upper magnetic core having a front end face confronting the magnetic recording medium, said front end face of said upper magnetic core having one end adjacent to said gap layer and an opposite end remote from said gap layer, said front end face of said upper magnetic core retreating from the magnetic recording medium such that said opposite end of said front end face is spaced more distantly from the magnetic recording medium than said one end of said front face, wherein said front end face of said upper magnetic core progressively retreats relative to the magnetic recording medium from said one end adjacent to said gap layer toward said opposite end remote from said gap layer.

18. A thin film magnetic head according to claim 17, wherein said progressive retreat of said front end face of said upper magnetic core is continuously provided from said one end to said opposite end.

19. A thin film magnetic head for recording and/or reproducing data on a magnetic recording medium, comprising:

(a) a non-magnetic substrate;

(b) a lower magnetic core disposed on said nonmagnetic substrate;

(c) an upper magnetic core disposed on said lower magnetic core with a gap layer disposed therebetween;

(d) a coil disposed between said upper and lower magnetic cores and electrically insulated from said upper and lower magnetic cores; and (e) said gap layer having a front end face confronting the magnetic recording medium, said upper magnetic core having a front end face confronting the magnetic recording medium, said front end face of said upper magnetic core having one end adjacent to said gap layer and an opposite end remote from said gap layer, said front end face of said upper magnetic core retreating from the magnetic recording medium such that said opposite end of said front end face is spaced more distantly from the magnetic recording medium than said one end of said front face, wherein said front end face of said upper magnetic core progressively retreats relative to the magnetic recording medium from said one end adjacent to said gap layer toward said opposite end remote from said gap layer.

20. A thin film magnetic head according to claim 19, wherein said progressive retreat of said front end face of said upper magnetic core is continuously provided from said one end to said opposite end.

21. A thin film magnetic head for recording and/or reproducing data on a magnetic recording medium, comprising:

(a) a non-magnetic substrate;

(b) a lower magnetic core disposed on said non-magnetic substrate;

(c) an upper magnetic core disposed on said lower magnetic core with a gap layer disposed therebetween;

(d) a coil disposed between said upper and lower magnetic cores and electrically insulated from said upper and lower magnetic cores; and (e) said gap layer having a front end face confronting the magnetic recording medium, said upper magnetic core having a front end face confronting the magnetic recording medium, said front end face of said upper magnetic core having one end adjacent to said gap layer and an opposite end remote from said gap layer, said front end face of said upper magnetic core retreating from the magnetic recording medium such that said opposite end of said front end face is spaced more distantly from the magnetic recording medium than said one end of said front face, wherein said front end face of said upper magnetic core extends continuously and arcuately from an end of said front end face of said gap layer.

* * * * *